US012685378B2

(12) United States Patent
Silva et al.

(10) Patent No.: US 12,685,378 B2
(45) Date of Patent: Jul. 21, 2026

(54) METHODS AND SYSTEMS FOR PRODUCING A BIO-BASED COSMETIC SPONGE AND BLENDER

(71) Applicant: Rea.deeming Beauty, Inc., Bethlehem, PA (US)

(72) Inventors: Rea Ann Silva, Bethlehem, PA (US); Philip Hamilton Sheridan, Saginaw, MI (US)

(73) Assignee: Rea.deeming Beauty, Inc., Bethlehem, PA (US)

( * ) Notice: Subject to any disclaimer, the term of this patent is extended or adjusted under 35 U.S.C. 154(b) by 757 days.

(21) Appl. No.: 17/516,551

(22) Filed: Nov. 1, 2021

(65) Prior Publication Data

US 2022/0133015 A1 May 5, 2022

Related U.S. Application Data

(60) Provisional application No. 63/108,177, filed on Oct. 30, 2020.

(51) Int. Cl.
| | |
|---|---|
| *A45D 34/04* | (2006.01) |
| *C08G 18/10* | (2006.01) |
| *C08G 18/64* | (2006.01) |
| *C08G 101/00* | (2006.01) |

(52) U.S. Cl.
CPC ............. *A45D 34/04* (2013.01); *C08G 18/10* (2013.01); *C08G 18/6484* (2013.01); *A45D 2200/1018* (2013.01); *C08G 2101/00* (2013.01); *C08G 2110/0083* (2021.01)

(58) Field of Classification Search
CPC ............ A45D 34/04; A45D 2200/1018; A45D 2200/1009; C08G 18/10; C08G 18/6484; C08G 2101/00; C08G 2110/0083; C08G 18/72; C08G 2110/0008
See application file for complete search history.

(56) References Cited

U.S. PATENT DOCUMENTS

| | | | |
|---|---|---|---|
| 4,246,360 A * | 1/1981 | Brown | C08G 18/6446 |
| | | | 521/107 |
| 10,323,116 B2 | 6/2019 | Svenson et al. | |
| 2004/0170670 A1 | 9/2004 | Smith et al. | |
| 2013/0102697 A1 | 4/2013 | Shinchi et al. | |
| 2015/0094387 A1 * | 4/2015 | Wiltz, Jr. | C08G 18/302 |
| | | | 502/159 |
| 2016/0068646 A1 | 3/2016 | Kumaki et al. | |
| 2017/0101501 A1 * | 4/2017 | Forkner | C08J 9/00 |
| 2018/0022855 A1 * | 1/2018 | Nanos | C08G 18/14 |
| | | | 521/159 |
| 2019/0100661 A1 * | 4/2019 | Stogner | C08K 7/04 |
| 2019/0335878 A1 | 11/2019 | Dörr et al. | |
| 2020/0308334 A1 | 10/2020 | Nanos | |

FOREIGN PATENT DOCUMENTS

| | | | | |
|---|---|---|---|---|
| CN | 110964161 A | 4/2020 | | |
| EP | 3643732 A1 | 4/2020 | | |
| KR | 20160108717 A | 9/2016 | | |
| WO | WO-9951668 A1 * | 10/1999 | .......... | C08G 18/092 |
| WO | 2019022414 A1 | 1/2019 | | |

OTHER PUBLICATIONS

"Molasses," Sugarcane. 2015 (Year: 2015).*
International Search Report and Written Opinion for, mailed Feb. 2, 2022.

* cited by examiner

*Primary Examiner* — K. Boyle
(74) *Attorney, Agent, or Firm* — Command IP LLP; Pejman Yedidsion

(57) ABSTRACT

Systems, devices, and methods for a cosmetic sponge comprising: a prepolymer material and a bio-based material, where the prepolymer material and the bio-based material are reacted with an additive component comprising water and bio-based material dissolved in the water.

11 Claims, 3 Drawing Sheets

200

202 — COMBINING PREPOLYMER MATERIAL WITH A BIO-BASED MATERIAL

204 — REACTING THE COMBINED PREPOLYMER MATERIAL AND BIO-BASED MATERIAL WITH WATER TO PRODUCE A "CLEAN" FOAM

300

301 COMBINING A PREPOLYMER MATERIAL WITH A BIO-BASED MATERIAL ON THE A-SIDE

303 COMBINING A REACTIVE COMPONENT WITH A BIO-BASED MATERIAL ON THE B-SIDE

305 REACTING THE COMBINED PREPOLYMER MATERIAL AND THE BIO-BASED MATERIAL WITH THE COMBINED REACTIVE COMPONENT AND BIO-BASED MATERIAL USING WATER TO PRODUCE A COSMETIC FOAM WITH AN INCREASE OF BIO-BASED MATERIAL RATIO

METHODS AND SYSTEMS FOR PRODUCING A BIO-BASED COSMETIC SPONGE AND BLENDER

CROSS-REFERENCE TO RELATED APPLICATIONS

This application claims priority to and the benefit of U.S. Provisional Patent Application No. 63/108,177, filed Oct. 30, 2020, the contents of which are hereby incorporated by reference herein for all purposes.

TECHNICAL FIELD

Embodiments relate generally to cosmetic applicators, and more particularly to cosmetic sponges.

BACKGROUND

A cosmetic sponge may be used to apply makeup, foundation, or the like. Cosmetic sponges can be delicate and may be damaged after use, such as by being crushed in a bag or torn by an object with sharp edges. In some instances, cosmetic sponges may increase greatly in size when damp and take several hours to return to their original size.

SUMMARY

A cosmetic sponge device embodiment may include: a cosmetic foam comprising: a prepolymer material comprising bio-based material on the A-side; a reactive component comprising bio-based material on the B-side; and where the prepolymer material and the reactive component may be combined in an additive fashion to form a material comprising bio-based material reacted with water, yielding an increase of bio-based material in the resulting cosmetic sponge.

In additional device embodiments, the reactive component bio-based material comprises sugar cane. In additional device embodiments, the prepolymer bio-based material makes up substantially 60% of the cosmetic sponge by weight on the A-side. In additional device embodiments, the prepolymer non-bio-based material makes up approximately 40% of the cosmetic sponge by weight on the A-side.

In additional device embodiments, the cosmetic sponge may be substantially free from traces of Tin. In additional device embodiments, the cosmetic sponge may be substantially free from traces of Amine. In additional device embodiments, the bio-based material comprises at least one of: sugar cane, cellulose fibers, zein, cornstarch, and methyl cellulous. In additional device embodiments, the cosmetic sponge may be in the shape of a teardrop shape and used for application of makeup.

A method embodiment for formation of bio-based cosmetic foam may include: combining a prepolymer material with a bio-based material on an A-side; combining a reactive component with a bio-based material on a B-side; and reacting the combined prepolymer material and the bio-based material with the combined reactive component and bio-based material using water to produce a cosmetic foam with an increase of bio-based material ratio. In additional method embodiments, the reactive component bio-based material comprises sugar cane. In additional method embodiments, the prepolymer bio-based material comprises substantially 60% of the cosmetic sponge by weight.

In additional method embodiments, the bio-based cosmetic foam may be free from traces of Tin. In additional method embodiments, the bio-based cosmetic foam may be substantially free from traces of Amine. In additional method embodiments, the bio-based material comprises at least one of: sugar cane, cellulose fibers, zein, cornstarch, and methyl cellulous. In additional method embodiments, the bio-based cosmetic foam may be used as a cosmetic sponge for application of makeup.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

As is commonly known, a polyurethane elastomer is comprised of two necessary components: the prepolymer (usually called the "A-side") and the additive or curative (usually called the "B-side"). The prepolymer consists of isocyanate groups (NCO) that react with either hydroxyl (OH) groups in the curative. There are numerous prepolymers available, but only a handful of different types in terms of chemical backbone structure may be applied to the present embodiments of a cosmetic foam. That is, an A-B reaction is made by combing the A-side material and B-side material as the two reactants to make a polyurethane foam used in the production of a cosmetic sponge.

The present systems, methods, and devices allow for a combination of a bio-based material with a prepolymer material in the production of a foam using a multi-step, for example, two-step process. In the two-step process the combined bio-based material and prepolymer material are reacted with water to create a clean foam without any substantial chemical catalysts. For example, a system embodiment may include: a cosmetic sponge comprising a prepolymer material and a bio-based material, wherein the prepolymer material and the bio-based material are reacted with water soluble which itself may comprise bio-based material. In the system embodiments, the cosmetic sponge may comprise at least 60% bio-based material on the A-side. Additionally, a method embodiment may include: combining a prepolymer material with a bio-based material; and reacting the combined prepolymer material and the bio-based material with water which also includes bio-based material to produce a bio-based cosmetic foam having bio-based material on both the A-side and B-side.

Figure 1B:
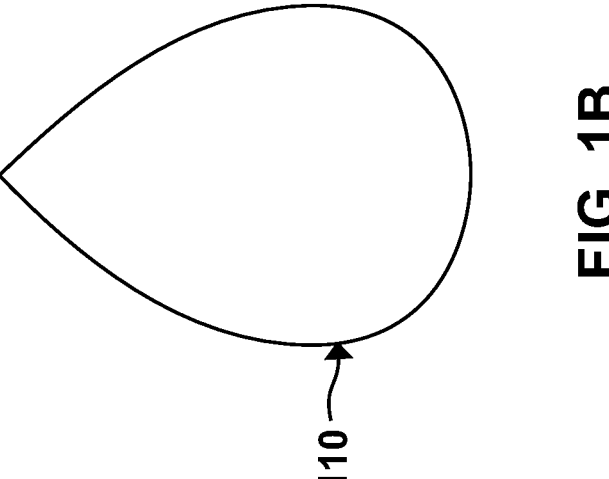
FIG. 1B depicts a dampened cosmetic sponge, according to one embodiment.
Figure 1A:
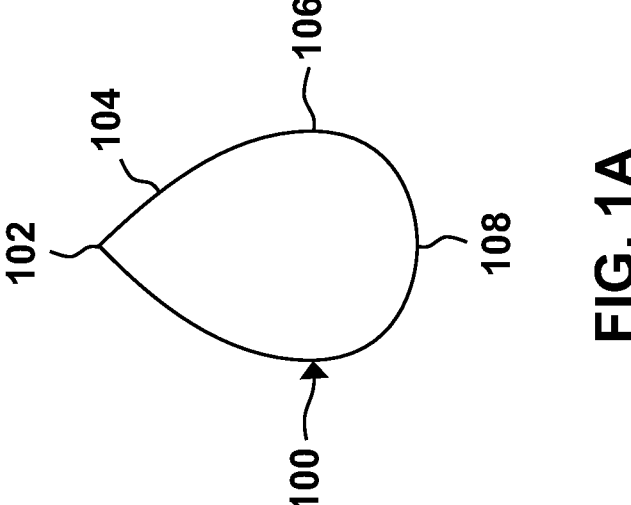
FIG. 1A depicts a dry cosmetic sponge, according to one embodiment.

FIG. 1A depicts a dry cosmetic sponge 100, according to the present embodiments. The cosmetic sponge may have a general teardrop shape as shown, an oval shape, or a shape with any number of contours. The various angles of the cosmetic sponge 100 are configured to allow the cosmetic sponge 100 to be used on various portions of a user's skin. The various angles of the cosmetic sponge 100 may also make the cosmetic sponge 100 susceptible to rolling on a flat surface, such as a countertop. The material of the cosmetic sponge 100 may also make the cosmetic sponge 100 susceptible to damage if stored with other objects, such as in a purse, handbag, or makeup container. In one embodiment, the cosmetic sponge 100 may comprise semi-absorbent material to allow for certain liquids having a thick consistency (increased viscosity) and/or a thin consistency to have different absorption levels. For example, makeup such as liquid foundation may have a higher viscosity and not be absorbed by the cosmetic sponge, whereas water having a lower viscosity would be absorbed for purposes of cleaning the sponge.

The cosmetic sponge 100 may include a tip portion 102. In some embodiments, the tip portion 102 may form a point. In other embodiments, the tip portion 102 may be rounded. The tip portion 102 may be surrounded by an angled portion 104. The angled portion may extend from a bulbous portion 106 to the tip portion 102 of the cosmetic sponge 102. The angled portion 104 may include a substantially flat section having a slight curve. The angled portion 104 provides an increased surface area for contact with a skin of a user when applying makeup, foundation, or the like from the cosmetic sponge 100. The tip portion 102 allows for fine application of makeup, foundation, or the like. For example, the tip portion may be used for areas around the eyes of a user. The bottom portion 108 may be surrounded by the bulbous portion 106. The bulbous portion 106 may be disposed proximate the bottom of the cosmetic sponge 100 so as to provide additional surface area for the angled portion 104 and the tip portion 102 when applying makeup, foundation, or the like. A user may grip the cosmetic sponge 100 proximate the bulbous portion 106, which allows the user to bounce the cosmetic sponge 100 against the skin while maintaining a secure grip on the cosmetic sponge 100. The bottom portion 108 may be used for applying and/or blending makeup, foundation, or the like on larger areas of the skin, such as cheeks, the neck, or the like. The cosmetic sponge 100 may have symmetry such that the cosmetic sponge 100 may be used without needing to orient the cosmetic sponge 100 in a particular direction. Accordingly, the cosmetic sponge 100 may be picked up and used by a user by feel where the user can adjust their grip by touch to apply makeup, foundation, or the like via the tip section 102, angled section 104, bulbous section 106, and/or bottom section 108.

The cosmetic sponge 100 may be configured to absorb liquid, where the cosmetic sponge comprises: a tip portion at one end of the cosmetic sponge; an angled portion, where the tip portion is surrounded by the angled portion; a bulbous portion, where the bulbous portion is disposed proximate a bottom of the cosmetic sponge; and a bottom portion, where the bottom portion is surrounded by the bulbous portion. The cosmetic sponge 100 may be further configured to have a different ratio of prepolymer material and bio-based material at different portions of the cosmetic sponge. That is, the portion of the cosmetic sponge requiring the most absorption element or characteristic may have a higher percentage of prepolymer or bio-based material. A user may then use the cosmetic sponge 100 to apply makeup with the portion of the cosmetic sponge that is suited for the level of absorption; since the density of the makeup may dictate where on the cosmetic sponge it should be used to absorb liquid depending on whether it is during applying makeup or removing the makeup. The cosmetic sponge 100 may be configured to provide, for example, the tip portion, the bulbous portion, or the bottom portion, different absorbent levels to account for cosmetic formulations that have low, medium, or high density (measure of mass per unit of volume).

FIG. 1B depicts a dampened cosmetic sponge 110, according to one embodiment. The cosmetic sponge (100, FIG. 1A) may be dampened, such as with water, prior to use. In another embodiment, the cosmetic sponge (100, FIG. 1A) may be dampened with a cleaning solution. Adding water to the cosmetic sponge (100, FIG. 1A) causes the dampened cosmetic sponge 102 to increase greatly in size. The dampened cosmetic sponge provides a greater surface area and absorption for applying makeup, foundation, or the like. Once the dampened cosmetic sponge 102 has been used for the intended purpose, the cosmetic sponge 102 may remain at the larger size for several hours before drying and returning to its original size.

A traditional polyurethane foaming process may be a one (1) step or "one shot" process. Such traditional polyurethane foaming process may use chemical catalysts such as Tin or Amine. In some cases, traces of the catalysts may be found in the final product. These traces of catalysts are unwanted chemicals for consumer products, especially those that touch a user's skin. Accordingly, the present embodiments provide a process where the end product/device is substantially free of any such catalysts.

Figure 2:
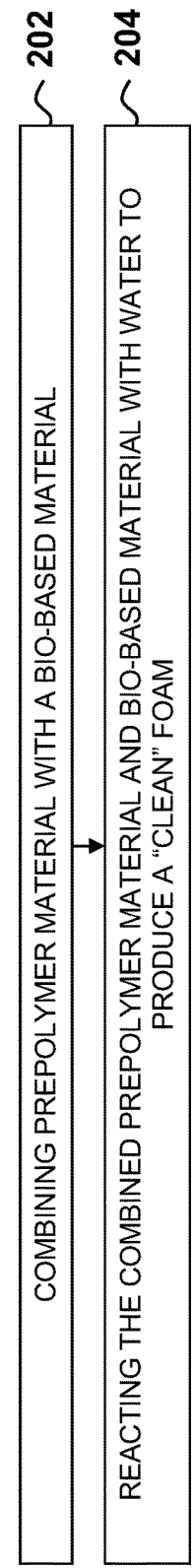
FIG. 2 depicts a high-level flowchart of a method embodiment of producing a foam cosmetic sponge, according to one embodiment.

FIG. 2 depicts a high-level flowchart of a method embodiment 200 of producing a foam cosmetic sponge, according to one embodiment of the present disclosure. The disclosed method 200 embodiment is a two (2) step process that substantially removes the need for catalysts and may include combining a prepolymer material with a bio-based material (step 202). The method 200 may then include reacting the combined prepolymer material and bio-based material with water to produce a "clean" foam (step 204). This resulting "clean" foam may be used to produce a cosmetic sponge, as in FIGS. 1A-1B.

Figure 3:
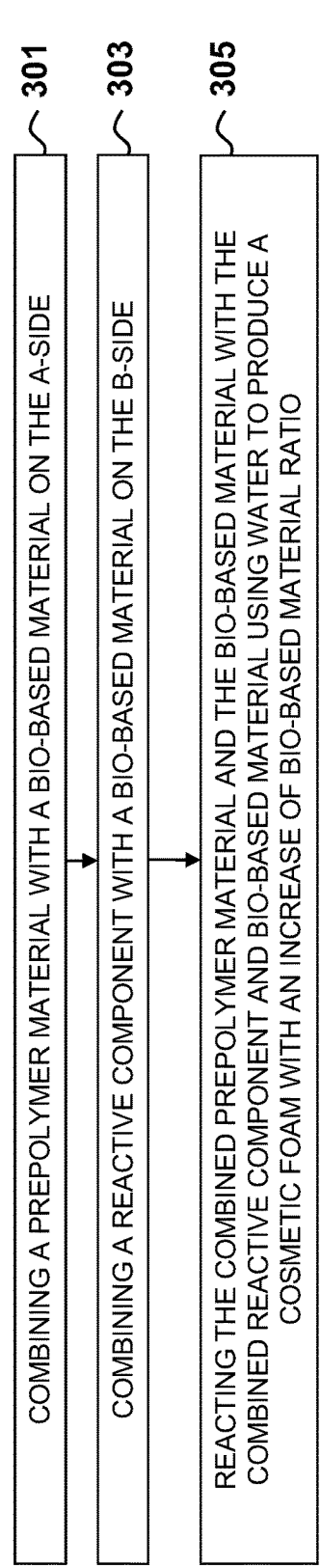
FIG. 3 depicts a high-level flowchart of a method embodiment of producing a foam cosmetic sponge, according to the two-step process embodiment.

FIG. 3 depicts a high-level flowchart of a method embodiment 300 of producing a foam cosmetic sponge, according to the two step-process embodiments of using bio-based content on the A-side and B-side. The disclosed method 300 embodiment includes the steps of: combining a prepolymer material with a bio-based material on the A-side (step 301); combining a reactive component with a bio-based material on the B-side (step 303); and reacting the combined prepolymer material and the bio-based material with the combined reactive component and bio-based material using water to produce a cosmetic foam with an increase of bio-based material ratio (step 305).

The polyurethane foaming process disclosed herein is a two-step process. The disclosed polyurethane foaming process substantially removes the need for catalysts altogether. In the disclosed process, the reaction happens with water and a prepolymer. The result of this process is a "clean" foam that removes the chances of unwanted chemicals remaining post foaming process. The resulting foam is safe for skin contact. Furthermore, the resulting foam may be substantially free of traces of heavy metals and substantially free of traces of amines. This two-step process also creates a foam that is "softer" than existing foams, because it is a more precise process and there is more control over the foaming process by way of the density of the A-side and B-side of the polyurethane elastomer. In one embodiment, density measurement may be in the range of 5 to 7 lbs. per cubic foot (lbs/ft$^3$). In some embodiments, this process may, but not necessarily, be more labor intensive and may require more energy than a one step process utilizing a chemical catalyst.

In one embodiment of the cosmetic foam two-step process, the foam is a two component material, one component being a prepolymer side ("A-side") have up to a 60% or greater bio-based content construction of the molecule making up the prepolymer. That is, the molecule is being constructed out of bio-based portions. In this embodiment, the B-side may also comprise bio-based additives, thereby providing further increase of the total bio content of the foam. Accordingly, by adding the B-side additives (comprising bio-based material) to A-side (also having 60% or more bio-based material), not only is the core prepolymer made of bio-based material but also the B-side additives. The disclosed embodiments include processes where the B-side may further increase the bio content of the foam by adding bio-based additives that may be water-based chemistry, via the additive portion to produce a final device or product. Accordingly, the B-side allows a further increase of the bio content of the cosmetic foam by adding bio-based additives to the core prepolymer (A-side) resulting in a net combined bio-material cosmetic foam.

In a scenario where the A-side comprises up to or at least 60% bio-based material, the process may only yield a foam with 60% bio content if the B-side does not contain any bio content. However, according to the disclosed embodiments, when the process includes a B-side that is 50% bio-based material along with the A-side that is 60% bio-based material, assuming a 50/50 mixture, the overall composition of the foam may now yield at 85% bio content. This is because the process embodiments disclosed herein are effectively diluting the non bio-based part of the prepolymer with a bio-based material, and thereafter adding additive content in the B-side that is also comprising of bio-based content, resulting in a combined (all mixed together) higher bio-based content. Accordingly, the higher the ratio or percentage of bio-based material on the B-side results in a higher bio content of the foam as a whole.

The disclosed process of producing a cosmetic foam with the aforementioned bio content, may yield a foam having the same characteristics as a non-bio content cosmetic foam, where such characteristic may include: density, tensile strength, elongation at break, tear strength, durometer shore, and/or average cell count. In one embodiment, the disclosed process may only be applicable to a cosmetic foam since the cosmetic foam is essentially water based, where any material that is dissolved in the foam will be automatically in the end foam; this is mainly due to the fact that other polyurethane foams would require use of petroleum on the A-side and/or petroleum on the B-side.

Therefore, the present embodiments disclose combining A-side isocyanate with B-side water soluble, thereby making a two component material of A-side and B-side, where the process may result in an additive effect to produce a cosmetic sponge having an increase (compared to a one-step process) of bio-content. That is, by the use of water, at the end of the disclosed process, the water is evaporated out and eventually removed or gotten rid of, making it that any materials included and dissolved in that water soluble, will remain when the water is removed or dried up. In one embodiment, the water soluble mixture may include sugar, starch, soy, etc. and used on the B-side since the mixture of water, sugar/starch/soy introduces a bio-based B-side mixture by way of the additive effect.

In one embodiment, the polyurethane foaming process may further include a step for forming a two layered foam. The process may include a step for first forming a bottom layer of foam having a high density measurement (mass per unit volume) and then pouring a top layer of foam having a lower density measurement. In this embodiment, the bottom layer of foam may have a 7:5 density ratio with the top layer of foam. The weight difference between the bottom layer and the top layer may range from a quarter pound difference to a half pound difference. According to this embodiment, the resulting cosmetic foam may have different density and/or percentage ratio of bio-content at different areas of the cosmetic foam to accommodate different uses depending on the side or area of the foam being used.

A portion of the prepolymer material may be replaced with a bio-based material. In one embodiment, sixty percent (60%) of the prepolymer material may be replaced with a bio-based material on the A-side to maintain the characteristics (e.g., density, tensile strength, elongation at break, tear strength, durometer shore, and/or average cell count) of a cosmetic foam that does not include bio-based material. Thereby, via the two part approach (two-step process) of combining an A-side material of 60% or greater bio-based component and B-side additive material containing bio-based component, the process allows to further increase the bio-content of the foam by adding bio-based additives. In some embodiments, the bio-based material may be derived from a renewable resource, such as sugar cane. A bio-based material is a material intentionally made from substances derived from living (or once-living) organisms. Some bio-based materials may be biodegradable. Bio-based materials may further include cellulose fibers, zein, cornstarch, sucrose (cane sugar), soy based polyols and the like. In such embodiments, by having an applicator sponge such as the disclosed cosmetic sponge, be made of naturally found material or bio-based material, it provides an environmentally friendly product that is bio-degradable. Advancements in the process and composition, such as replacing non-renewable resources with ones that is renewable, permit the overall process to become more sustainable now and for the future.

In some embodiments, the bio-based material may include sugar cane in the form of a dissolvable sugar that does not interfere with the foaming process. In embodiments where cosmetic sponges are used for applying cosmetic makeup, the cosmetics are constituted from a mixture of chemical compounds derived from either natural sources or synthetically created ones.

In one embodiment, replacing sixty percent (60%) of the prepolymer material with the bio-based material results in a foam that has a similar look and feel when compared to a foam having been created with only prepolymer material. As a result, the disclosed processes use more sustainable products without adversely impacting the look and feel of the resulting foam. However, it may be that bio-based materials do not provide the same absorptivity or other features as non-bio-based material made using traditional polyurethane foaming processes. Therefore, using all bio-based material that is a material intentionally made from substances derived from living (or once-living) organisms may lack certain features and physical substance.

Through trial and error along with experimentation of using different ratios of bio-based material and polymers, embodiments were attained at the 60% weight for weight or weight by weight (w/w) bio-based formulation on the A-side. Such a specific combination is based on reasons such as maintaining the same integrity as other non-bio-based formulation sponges. According to some embodiments, formulations between an approximate range of 0-70% w/w of the foam can be replaced with bio-based materials, where the remaining portion cannot be replaced and successfully produce a foam product. One reason for the above percentage is that there are some components in the formulation where bio-based alternatives are not available to substitute for.

Using multiple iterations and employing several different w/w ratios, in the disclosed embodiments, the ingredients from the non-bio-based formulation that could be replaced and/or substitution were experimented with to determine what ingredients may be replaced. Based on the results of the experimentation disclosed above, it was determined that at 60% w/w, again after several trials, provided an optimized look, feel, and physical properties of the foam product. Specifically, characteristics and/or features such as pores per inch, density, Indentation Force Deflection (hardness), tensile strength, elongation, and tear strength were tested to determine whether the end product matched the existing non-bio-based product as closely as possible.

For example, when other percentages lower than 60% were tested, the properties weren't acceptable (e.g., pore size too large, etc.), and when percentages above 60% were tested, it was found that processing the foam into an acceptable product became difficult. Accordingly, the disclosed ratio provides a balance of the ability to maintain a feature set required by the cosmetic sponge and a level of bio-based formulation sustainability. Accordingly, on the A-side, a ratio of substantially 60% bio-based material and 40% prepolymer material by water weight may be combined to yield a preferred embodiment. Substantially is defined to account for variances in manufacturing such that the preferred embodiment covers small adjustments to this preferred ratio.

In one embodiment, the cosmetic foam used in making the cosmetic sponge, may have an increase in ratio of bio-based material due to the fact that foam is constructed using an A-side bio-based material and a B-side bio-based material. The formation of the bio-based material used in constructing the cosmetic foam may include using a first bio-based material in the A-side of the prepolymer base and the second bio-based material in the B-side of the reactive component.

In one embodiment, Indentation Force Deflection, which may be defined as a process used in the flexible foam manufacturing industry to assess the "softness" or "hardness" of a sample of foam was used to determine whether cosmetic makeup was able to be applied in the same manner to the user's skin. That is, absorption and application of the cosmetic sponge and blender was tested to determine whether it maintained the same level as previously to allow the bio-based material to be used to provide the inherent advantage of working on sensitive skin and being biodegradable. As disclosed above, additional properties were tested rigorously and it was determined a 6:4 ratio of bio-based material to non-bio-based material provided the most balanced composition.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

8

What is claimed is:

1. A cosmetic sponge comprising:
a polyurethane foam formed as a two-layer foam including
a bottom layer having a first density and a top layer having a second density, wherein the second density is lower than the first density, and wherein the bottom layer and the top layer have a density ratio of 7:5 as measured by mass per unit volume;
wherein the polyurethane foam comprises a bio-based material comprising Zein;
wherein the bio-based material is incorporated into at least one of: the bottom layer and the top layer during formation of the polyurethane foam; and
wherein the cosmetic sponge is substantially free of traces of tin and substantially free of traces of amine.

2. The cosmetic sponge of claim 1, wherein the bio-based material comprising Zein is incorporated into only the top layer of the polyurethane foam.

3. The cosmetic sponge of claim 1, wherein the bio-based material comprising Zein is incorporated into only the bottom layer of the polyurethane foam.

4. The cosmetic sponge of claim 1, wherein the cosmetic sponge comprises a tip portion, an angled portion, a bulbous portion, and a bottom portion.

5. The cosmetic sponge of claim 4, wherein the tip portion is configured for fine application of cosmetic product and the bulbous portion is configured for application to larger skin areas.

6. A method of forming a cosmetic sponge, comprising:
forming a bottom layer of polyurethane foam having a first density;
forming a top layer of polyurethane foam having a second density, wherein the second density is lower than the first density; and
combining the bottom layer and the top layer to form a cosmetic sponge,
wherein the bottom layer and the top layer have a density ratio of 7:5 as measured by mass per unit volume,
wherein the polyurethane foam comprises a bio-based material comprising Zein, and
wherein forming the polyurethane foam is performed without introducing tin-based catalysts or amine-based catalysts, such that the cosmetic sponge is substantially free of traces of tin and substantially free of traces of amine.

7. The method of claim 6, wherein forming the top layer comprises pouring the top layer onto the bottom layer after the bottom layer is formed.

8. The method of claim 6, wherein forming the polyurethane foam comprises producing a foam having a density in the range of 5 to 7 pounds per cubic foot.

9. The method of claim 6, wherein incorporating the bio-based material comprising Zein comprises incorporating Zein into only the top layer during formation.

10. The method of claim 6, wherein incorporating the bio-based material comprising Zein comprises incorporating Zein into only the bottom layer during formation.

11. The method of claim 6, wherein the cosmetic sponge is in the shape of a teardrop shape and used for application of makeup.

* * * * *